(12) United States Patent
Wagner et al.

(10) Patent No.: US 11,097,367 B2
(45) Date of Patent: Aug. 24, 2021

(54) SYSTEM AND METHOD FOR REDUCING WELD ROOT CONCAVITY

(71) Applicant: ILLINOIS TOOL WORKS INC., Glenview, IL (US)

(72) Inventors: Dustin Carter Wagner, Little Chute, WI (US); Richard Martin Hutchison, Iola, WI (US)

(73) Assignee: Illinois Tool Works Inc., Glenview, IL (US)

( * ) Notice: Subject to any disclaimer, the term of this patent is extended or adjusted under 35 U.S.C. 154(b) by 122 days.

(21) Appl. No.: 14/718,878

(22) Filed: May 21, 2015

(65) Prior Publication Data

US 2016/0339532 A1 Nov. 24, 2016

(51) Int. Cl.
*B23K 9/028* (2006.01)
*B23K 9/16* (2006.01)
*B23K 9/32* (2006.01)
*B23K 37/06* (2006.01)
*B23K 37/053* (2006.01)
*B23K 101/04* (2006.01)

(52) U.S. Cl.
CPC .......... *B23K 9/0286* (2013.01); *B23K 9/0282* (2013.01); *B23K 9/16* (2013.01); *B23K 9/325* (2013.01); *B23K 37/053* (2013.01); *B23K 37/06* (2013.01); *B23K 2101/04* (2018.08)

(58) Field of Classification Search
CPC .. B23K 2201/04; B23K 37/053; B23K 37/06; B23K 9/0282; B23K 9/0286; B23K 9/16; B23K 9/325
See application file for complete search history.

(56) References Cited

U.S. PATENT DOCUMENTS 3,095,844 A * 7/1963 Thielsch ................ B23K 9/325
137/561 R
3,777,103 A * 12/1973 White .................. B23K 9/0286
219/60 A
4,000,392 A * 12/1976 Banas ................ B23K 26/0643
219/121.63

(Continued)

FOREIGN PATENT DOCUMENTS

DE 3544280 6/1987
EP 2703109 3/2014

OTHER PUBLICATIONS

International Search Report from PCT application No. PCT/US2016/026210, dated Jun. 28, 2016, 9 pgs.

(Continued)

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

A method of controlling a back weld root surface includes arranging a sealing portion along the back weld root surface of a workpiece to form a purge region adjacent to a section of a joint, supplying a shielding gas within the purge region at a first flow rate, and applying a weld deposit across a front surface of the section of the joint. The shielding gas displaces an ambient environment within the purge region, and the back weld root surface of the weld deposit includes a positive root penetration relative to the back weld root surface based at least in part on the shielding gas within the purge region.

21 Claims, 4 Drawing Sheets

(56) References Cited

U.S. PATENT DOCUMENTS

| | | | | |
|---|---|---|---|---|
| 4,078,167 A * | 3/1978 | Banas | | B23K 10/02 |
| | | | | 219/121.11 |
| 4,283,617 A * | 8/1981 | Merrick | | B23K 9/0286 |
| | | | | 219/125.1 |
| 4,415,114 A * | 11/1983 | Hallenbeck | | B23K 9/325 |
| | | | | 228/219 |
| 4,421,971 A * | 12/1983 | Ukai | | B23K 9/0282 |
| | | | | 219/122 |
| 4,912,293 A * | 3/1990 | Mueller | | B23K 9/0288 |
| | | | | 219/136 |
| 4,916,281 A | 4/1990 | Flasche | | |
| 5,231,258 A * | 7/1993 | Hunt | | B23K 9/162 |
| | | | | 219/74 |
| 5,290,989 A * | 3/1994 | Zibilich | | B23K 9/164 |
| | | | | 219/74 |
| 5,398,862 A * | 3/1995 | Aleman | | B23K 9/0282 |
| | | | | 219/74 |
| 5,484,973 A * | 1/1996 | Gittens | | B23K 9/162 |
| | | | | 219/61 |
| 5,669,547 A * | 9/1997 | Spring | | B23K 9/164 |
| | | | | 228/219 |
| 5,824,983 A | 10/1998 | Huddleston | | |
| 5,864,111 A * | 1/1999 | Barefoot | | B23K 9/0286 |
| | | | | 219/61 |
| 6,563,072 B1 * | 5/2003 | Ohmi | | B23K 9/0026 |
| | | | | 219/72 |
| 6,617,548 B1 * | 9/2003 | Bosio | | B23K 9/0286 |
| | | | | 219/125.11 |
| 7,220,935 B2 * | 5/2007 | Ireland | | B23K 9/293 |
| | | | | 219/136 |
| 9,095,922 B1 * | 8/2015 | Shearin | | B23K 9/173 |
| 2004/0079732 A1 * | 4/2004 | Dasbach | | B23K 9/16 |
| | | | | 219/74 |
| 2008/0203065 A1 * | 8/2008 | Feldhausen | | B23K 9/013 |
| | | | | 219/68 |
| 2009/0145884 A1 * | 6/2009 | Ammann | | B23K 9/325 |
| | | | | 219/74 |
| 2010/0012625 A1 * | 1/2010 | Silk | | B23K 9/164 |
| | | | | 219/59.1 |
| 2011/0108535 A1 * | 5/2011 | Kawaguchi | | B23K 26/147 |
| | | | | 219/121.84 |
| 2012/0175350 A1 * | 7/2012 | Birch | | B23K 9/16 |
| | | | | 219/74 |
| 2013/0313229 A1 * | 11/2013 | Comon | | B23K 9/16 |
| | | | | 219/74 |
| 2014/0004270 A1 * | 1/2014 | Sherman | | C23C 24/08 |
| | | | | 427/444 |
| 2014/0263192 A1 * | 9/2014 | Miller | | B23K 9/325 |
| | | | | 219/75 |
| 2015/0108094 A1 * | 4/2015 | Siewert | | B23K 9/164 |
| | | | | 219/74 |
| 2016/0263693 A1 * | 9/2016 | Neil | | B23K 9/325 |

OTHER PUBLICATIONS

Narita, Kunio et al.; "Plasma Arc Welding of Pipelines: A Study to Optimise Welding Conditions for Horizontal Fixed Joints of Mild Steel Pipes," Nippon Kokan Co. Ltd, Technological Department, Yokahama, Japan, Feb. 10, 1975.

* cited by examiner

SYSTEM AND METHOD FOR REDUCING WELD ROOT CONCAVITY

BACKGROUND

The invention relates generally to welding systems, and particularly to welding systems for welding a root pass.

Welding is a process that has become ubiquitous in various industries for a variety of applications. For example, welding is often used in applications such as shipbuilding, offshore platform, construction, pipe mills, and so forth. Arc welding systems generally apply electrical current to an electrode to form an arc between the electrode and a workpiece, thereby forming a weld deposit on the workpiece. The structure (e.g., shape) of the weld deposit may affect qualities of the weld. For example, specifications for a weld joint may specify a root depth, thickness, or root shape. Moreover, forces (e.g., gravity) on the weld deposit may differently affect the shape and structure of the weld deposit based on the welding position of the torch and the electrode relative to the workpiece.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a method of controlling a back weld root surface includes arranging a sealing portion along the back weld root surface of a workpiece to form a purge region adjacent to a section of a joint, supplying a shielding gas within the purge region at a first flow rate, and applying a weld deposit across a front surface of the section of the joint. The shielding gas displaces an ambient environment within the purge region, and the back weld root surface of the weld deposit includes a convex root surface with a positive root penetration relative to the back weld root surface based at least in part on the shielding gas within the purge region.

In another embodiment, a welding system includes a back purging system with a sealing portion and gas control valving. The sealing portion is configured to form a purge region between the sealing portion and a back weld root surface of a workpiece adjacent to a section of a joint. The gas control valving is coupled to the sealing portion, and the gas control valving is configured to supply a shielding gas to the sealing portion. The shielding gas disposed within the purge region displaces an ambient environment within the purge region. The shielding gas is configured to control the back weld root surface of a weld deposit formed along the section of the joint to have a convex root surface with a positive root penetration relative to the back weld root surface.

In another embodiment, a welding system includes a back purging system and a robotic system. The back purging system includes a sealing portion and gas control valving coupled to the sealing portion. The sealing portion is configured to form a purge region between the sealing portion and a back weld root surface of a workpiece adjacent to a section of a joint. The section of the joint is configured to receive a weld deposit from a welding torch disposed in an out-of-position welding position. The gas control valving is configured to supply the shielding gas to the sealing portion to displace an ambient environment within the purge region. The shielding gas includes argon, nitrogen, less than approximately 5 percent carbon dioxide, or any combination thereof. The shielding gas is configured to control the back weld root surface of the weld deposit formed along the section of the joint to have a convex root surface with a positive root penetration relative to the back weld root surface. The robotic system is configured to move the welding torch along the joint to apply the weld deposit on a front surface of the workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
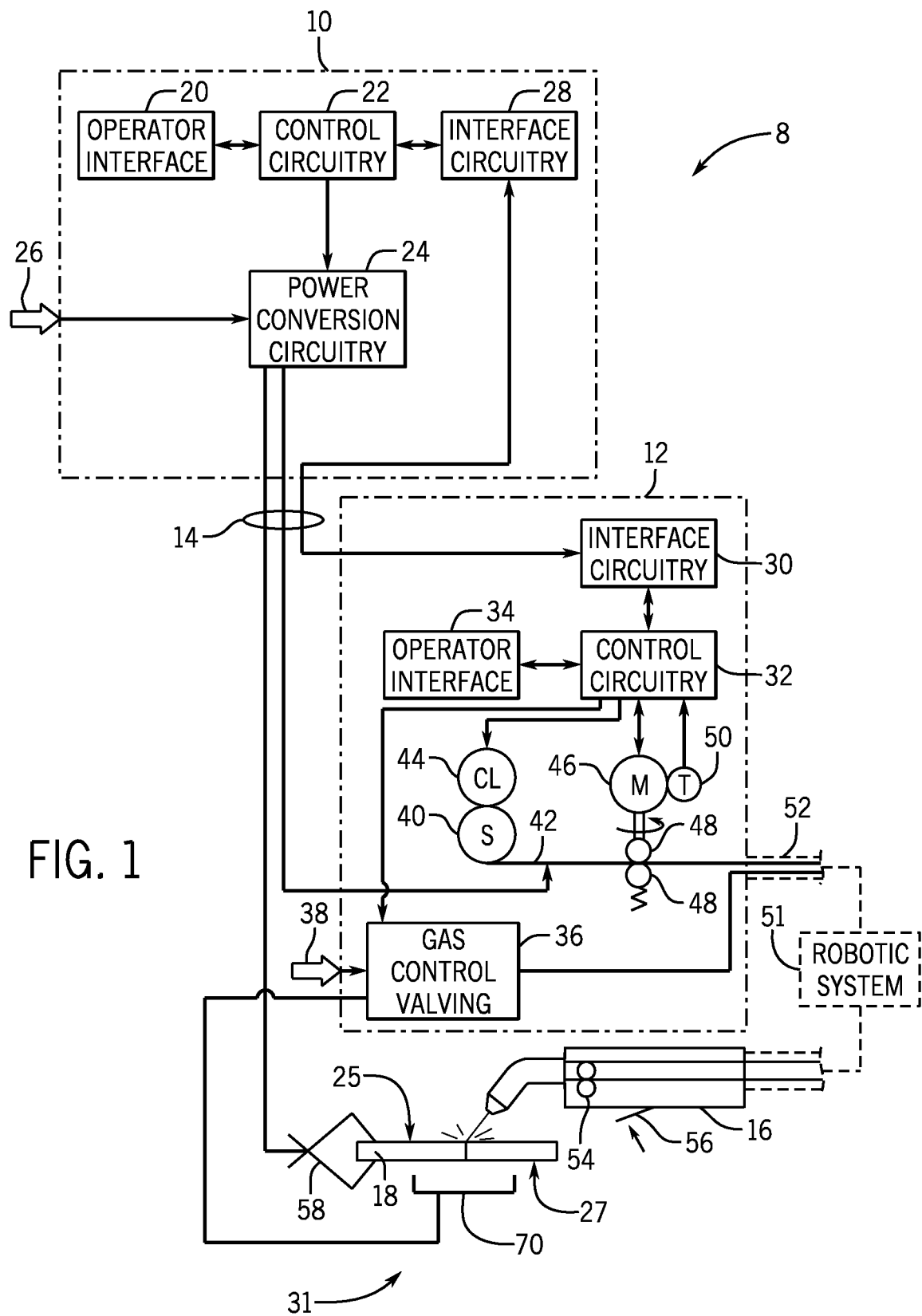
FIG. 1 is a diagrammatical representation of an embodiment of a welding system for performing welding operations with a back purging system.

FIG. 1 illustrates an embodiment of a welding system 8 that has a power supply 10 and a wire feeder 12 coupled to one another via conductors or conduits 14. In the illustrated embodiment the power supply 10 is separate from the wire feeder 12, such that the wire feeder 12 may be positioned at some distance from the power supply 10 near a welding location. However, it should be understood that the wire feeder 12, in some implementations, may be integral with the power supply 10. In such cases, the conduits 14 would be internal to the system. In embodiments in which the wire feeder 12 is separate from the power supply 10, terminals are typically provided on the power supply 10 and on the wire feeder 12 to allow the conductors or conduits 14 to be coupled to the systems so as to allow for power and gas to be provided to the wire feeder 12 from the power supply 10, and to allow data to be exchanged between the two devices.

The welding system 8 is designed to provide power and shielding gas to a welding torch 16. In some embodiments, as the wire feeder 12 provides the welding wire (e.g., electrode) to the welding torch 16. It should be appreciated that, while the present discussion may focus specifically on a gas metal arc welding (GMAW) system 8, the presently disclosed methods may be used in systems using any arc welding process with a gas line (e.g., FCAW, FCAW-G, GTAW (i.e., TIG), or similar arc welding process). As will be appreciated by those skilled in the art, the welding torch 16 may be of many different types, and typically allows for the feed of a welding wire 42 and gas to a location adjacent to a workpiece 18 where a weld is to be formed to join two or more workpieces 18. A second conductor (e.g., clamp 58) is typically run to the welding workpiece 18 so as to complete an electrical circuit between the power supply 10 and the workpiece 18 through the welding torch 16.

The operator of the welding system 8 may select data settings (e.g., weld parameters, gas flow parameters, arc length) to be selected by the operator via an operator interface 20 provided on the power supply 10. The operator interface 20 communicates the data settings to control circuitry 22 within the power supply 10. The control circuitry 22 may control power conversion circuitry 24 based at least in part on the weld parameters, and the control circuitry 22 may control gas control valving 36 of the power supply 10 or the wire feeder 12 based at least in part on the gas flow parameters. In some embodiments, the operator interface 20 is incorporated into a front faceplate of the power supply 10. In particular, the welding system 8 is configured to allow for MIG welding with various steels (e.g., high alloy steels, low alloy steels), aluminums, or other welding wire that is channeled through the welding torch 16. The gas control valving 36 may direct a shielding gas 38 to a front surface 25 of the workpiece 18 via the welding torch 16 and/or to a back surface 27 of the workpiece 18.

The control circuitry 22 operates to control generation of welding power output from the power conversion circuitry 24 that is applied to the welding wire 42 for carrying out the desired welding operation. This power conversion circuitry 24 is adapted to create the output power, such as pulsed waveforms that will ultimately be applied to the welding wire at the welding torch 16. Various power conversion components may be employed within the power conversion circuitry 24, including, but not limited to, choppers, boost circuitry, buck circuitry, inverters, converters, transformers, and so forth. The configuration of such power conversion circuitry 24 may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply 10 illustrated in FIG. 1 includes interface circuitry 28 (e.g., communications circuitry) designed to allow the control circuitry 22 to exchange signals with the wire feeder 12 via wired or wireless signals.

The wire feeder 12 includes complimentary interface circuitry 30 (e.g., communications circuitry) that is coupled to the interface circuitry 28 via a wired or wireless connection. In some embodiments, multi-pin interfaces may be provided on both interface circuitry components 28, 30 and a multi-conductor cable run between the respective interface circuitry components enables information as wire feed speeds, processes, selected currents, voltages, arc lengths, power levels, or gas flow levels, and so forth to be set on either the power supply 10, the wire feeder 12, or both.

The wire feeder 12 also includes control circuitry 32 coupled to the interface circuitry 30. The control circuitry 32 allows for wire feed speeds to be controlled in accordance with operator selections, and permits these settings to be fed back to the power supply 10 via the interface circuitry 30. The control circuitry 32 is coupled to an operator interface 34 on the wire feeder 12 that allows selection of one or more weld parameters, particularly wire feed speed. The operator interface 34 may also allow for selection of such weld parameters as the process, the type of wire utilized, current, voltage, arc length, power settings, or gas flow levels, and so forth. The control circuitry 32 is also coupled to gas control valving 36 which regulates the flow of shielding gas to the torch 16 and/or to the back surface 27 of the workpiece 18. In general, such gas is provided at the time of welding, and may be turned on immediately preceding the weld and/or for a short time following the weld. In some embodiments, the shielding gas supplied to the front surface 25 and/or to the back surface 27 may be provided prior to welding to displace ambient gases that may otherwise have undesirable effects on the resulting weld deposit. As described in detail below, the shielding gas supplied to the back surface 27 is supplied via a back purging system 31. The gas supplied to the gas control valving 36 is typically provided in the form of pressurized bottles, as represented by reference numeral 38. The shielding gas 38 supplied to the gas control valving 36 may include, but is not limited to, argon, nitrogen, and mixtures of argon and carbon dioxide (e.g., 95% Ar, 5% $CO_2$).

The wire feeder 12 includes components for feeding wire to the welding torch 16 and thereby to the welding application, under the control of control circuitry 36. For example, one or more spools 40 of welding wire are housed in the wire feeder 12. Welding wire 42 is unspooled from the spools 40 and is progressively fed to the welding torch 16. The spool 40 may be associated with a clutch 44 that disengages the spool 40 when wire 42 is to be fed to the torch 16. The clutch 44 may also be regulated to maintain a minimum friction level to avoid free spinning of the spool 40. A feed motor 46 is provided that engages with feed rollers 48 to push wire 42 from the wire feeder 12 towards the torch 16. In practice, one of the rollers 48 is mechanically coupled to the feed motor 46 and is rotated by the feed motor 46 to drive the wire 42 from the wire feeder 12, while the mating roller 48 is biased towards the wire 42 to maintain good contact between the two rollers 48 and the wire 42. Some systems may include multiple rollers 48 of this type. Finally, a tachometer 50 may be provided for detecting the speed of the motor 46, the rollers 48, or any other associated component so as to provide an indication of the actual wire feed speed. Signals from the tachometer 50 are fed back to the control circuitry 36, such as for calibration.

It should be noted that other system arrangements and input schemes may also be implemented. For example, the welding wire 42 may be fed from a bulk storage container (e.g., a drum) or from one or more spools 40 outside of the wire feeder 12. Similarly, the wire 42 may be fed from a "spool gun" in which the spool 40 is mounted on or near the welding torch 16. In some embodiments, a robotic system 51 coupled to the welding torch 16 controls the movement of the welding torch 16 relative to the workpiece 18. As discussed in detail herein, the robotic system 51 may be coupled to the workpiece 18 (e.g., pipe) and configured to move the welding torch 16 along a joint of the workpiece 18 during welding. Additionally, or in the alternative, the robotic system 51 may include a robotic arm coupled to the welding torch 16, wherein the robotic arm is not coupled to the workpiece 18.

Power from the power supply 10 is applied to the wire 42, typically by means of a welding cable 52 in a conventional manner. Similarly, shielding gas is fed through the wire feeder 12 and the welding cable 52. During welding operations, the wire 42 is advanced through the welding cable jacket towards the torch 16. Within the torch 16, an additional pull motor 54 may be provided with an associated drive roller, particularly for aluminum alloy welding wires. A trigger switch 56 on the torch 16 provides a signal that is fed back to the wire feeder 12 and therefrom back to the power supply 10 to enable the welding process to be started and stopped by the operator. That is, upon depression of the trigger switch 56, gas flow is begun, wire 42 is advanced, power is applied to the welding cable 52 and through the torch 16 to the advancing welding wire. These processes are also described in greater detail below. Finally, a workpiece cable and clamp 58 allow for closing an electrical circuit from the power supply through the welding torch 16, the electrode (welding wire 42), and the workpiece 18 for maintaining the welding arc during the welding operation.

Figure 2:
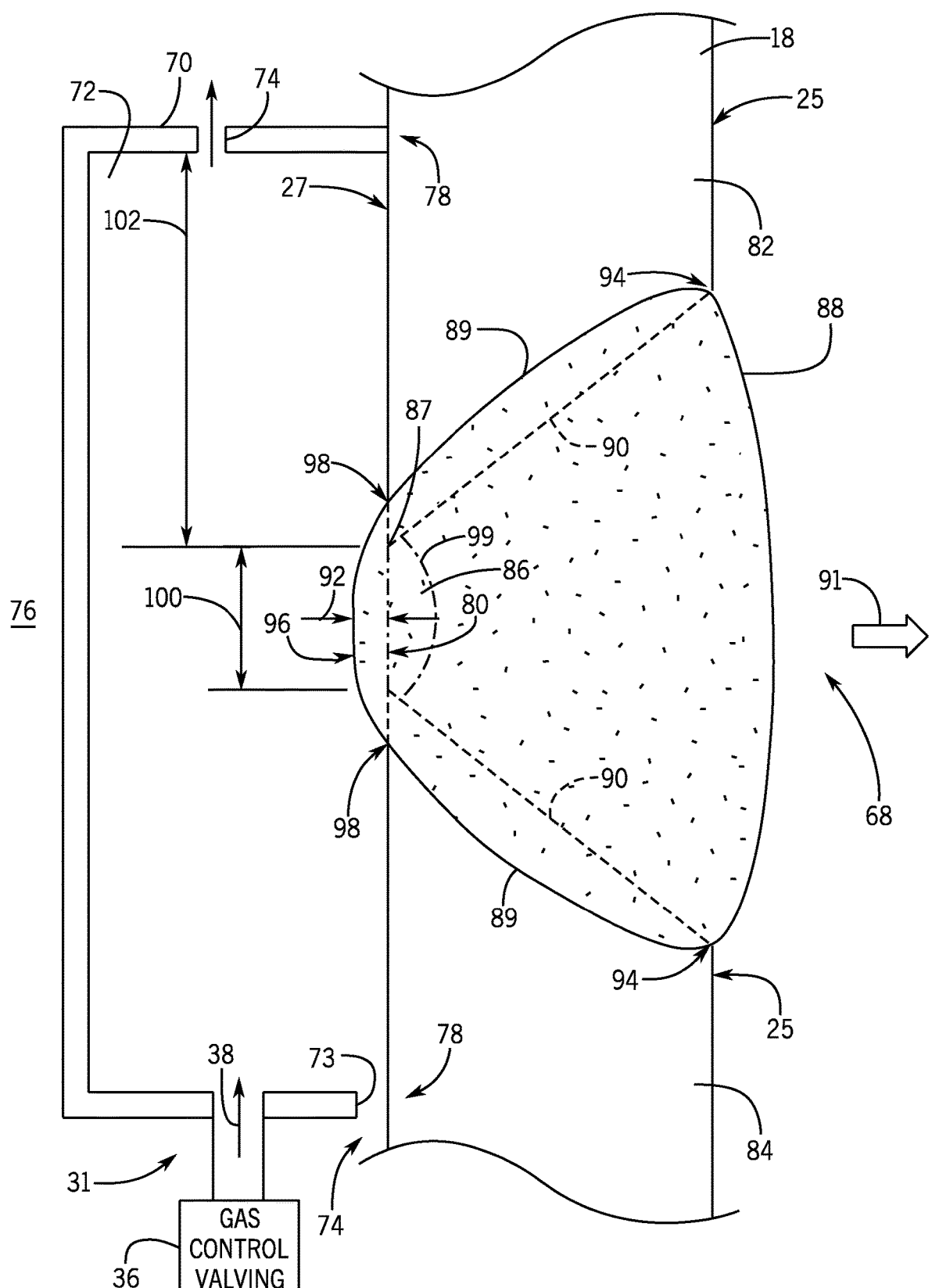
FIG. 2 is a front view of an embodiment of the back purging system for welding a joint.

The back purging system 31 is configured to supply the shielding gas 38 to the back surface 27 of the workpiece 18 to affect the structure of the deposited weld material and the workpiece 18 at a joint 68. FIG. 2 illustrates a cross-sectional side view of an embodiment of the workpiece 18 and the back purging system 31. A sealing portion 70 of the back purging system 31 receives the shielding gas 38 from the gas control valving 36 and at least partially retains the shielding gas 38 proximate to the back surface 27 within a purge region 72. The shielding gas 38 received in the purge region 72 between the sealing portion 70 and the back surface 27 displaces the ambient gases (e.g., oxygen) that may otherwise react with the workpiece 18 and/or a weld deposit 88 in the purge region 72. That is, the shielding gas 38 shields the workpiece 18 and/or the weld deposit 88 from gases (e.g., oxygen), thereby reducing or eliminating the formation of less desirable compounds and/or undesired geometries (e.g., root concavity) on the back surface 27 of the workpiece 18. In some embodiments, the gas control valving 36 provides the shielding gas 38 to the purge region 72 at a greater initial flow rate to rapidly displace the ambient environment prior to the welding operation, then the gas control valving 36 provides the shielding gas 38 to the purge region 72 at a lesser steady state flow rate to maintain the shielding gas 38 within the purge region during the welding operation.

The sealing portion 70 may have one or more openings 74 that enable the displaced gases and at least some of the shielding gas 38 of the purge region 72 to exit. In some embodiments, the openings 74 are between the back surface 27 of the workpiece 18 and the sealing portion 70, such that at least segments of the sealing portion 70 do not interface with the back surface 27. In some embodiments, substantially an entire seal surface 73 of the sealing portion 70 may interface with the back surface 27 of the workpiece 18, thereby substantially isolating the purge region 72 from an external environment 76. The sealing portion 70 may extend over the joint 68 and may interface with the workpiece 18 on opposite sides of the joint 68. In some embodiments, the sealing portion 70 interfaces with the back surface 27 of the workpiece 18 at points 78 that are outside of a heat affected zone (HAZ) of the joint 68. In some embodiments, the sealing portion 70 is formed of a flexible material, such as plastic or rubber. For example, the sealing portion 70 may be formed from approximately half of a flexible conduit, thereby enabling the flexible conduit to substantially follow the contour of the back surface 27 of the workpiece 18 (e.g., pipe) and form the purge region 72 along the joint 68.

The purge region 72 receives the shielding gas 38 prior to weld formation in the joint 68. The shielding gas 36 may exit the purge region 72 through an opening 80 of the joint 68 between sections 82, 84 of the workpiece 18 until a portion 86 of a weld deposit 88 closes the opening 80. As may be appreciated, the term "opening" as discussed herein may include open roots where sections 82, 84 are separated by a non-zero distance 100 (e.g., less than approximately 1.0, 0.75, 0.5, or 0.25 inches), and the term "opening" may include closed roots where sections 82, 84 of the workpiece 18 are in contact, such as at a root face 87 (i.e., distance 100 is approximately zero). In some embodiments, a face 90 of the weld joint 68 is beveled and/or curved to facilitate formation of the joint 68 with a relatively thick workpiece 18. The region between the solid outline 89 of the weld deposit 88 and the face 90 the workpiece 18 shown in FIG. 2 illustrates the penetration (e.g., fusion zone) of the weld deposit 88 into the workpiece 18. The weld deposit 88 includes the material of the welding wire 42, and the weld deposit 88 may include melted portions of the workpiece 18.

As discussed above, a shielding gas 38 may be supplied to the front surface 25 of the workpiece 18 when the weld deposit 88 is formed, thereby reducing reactions of the molten weld deposit 88 and the workpiece 18 with the external environment 76. In some embodiments, the shielding gas 38 is supplied to the purge region 72 proximate to the back surface 27 at a greater flow rate (e.g., approximately 3 to 5 times greater) than the shielding gas 38 is directed toward the front face 25. For example, the flow rate of the shielding gas 38 in the purge region 72 may be between approximately 10 to 40 cubic feet per hour (CFH), and the flow rate of the shielding gas 38 toward the front face 25 from the welding torch 16 may be between approximately 10 to 35 CFH. Accordingly, a portion of the shielding gas 38 may flow in a direction 91 through the opening 80 towards the torch 16 during the welding operation until the portion 86 of the weld deposit 88 closes the joint 68.

The structure and the geometry (e.g., concave, convex) of a root surface 96 of the weld deposit 86 relative to the back surface 27 of the workpiece 18 is affected by multiple factors. The factors that may affect the structure and the geometry of the root surface 96 may include, but are not limited to, the joint position (e.g., overhead, vertical, horizontal, flat), gravity, the welding direction, the surface tension of the molten weld deposit 88, the shape of the joint 68 (e.g., square, bevel, V, J, U), the gas composition about the molten weld deposit 88, and the cooling rate of the molten weld deposit 88. For example, gravity draws the molten weld deposit 88 downward, which is towards the root opening 80 for flat joint positions. However, downward for overhead joint positions is towards a toe 94 and away from the root opening 80. The shielding gas 38 in the purge region 72 may affect the surface tension of the molten weld deposit 88, thereby affecting the geometry of the root surface 96. It is believed that some shielding gases 38 (e.g., nitrogen, argon, argon with approximately 5% or less carbon dioxide) may increase the cohesion of the components of the molten weld deposit 88 relative to the adhesion of the molten weld deposit 88 to the workpiece 18, thereby forming a convex root surface 96 with a positive root penetration 92 relative to the back surface 27, as shown in FIG. 2. As may be appreciated, fluids having a relatively high surface tension may form a convex shape between solid surfaces, and fluids having a relatively low surface tension may form a concave shape between solid surfaces. The dashed-dot line 99 indicates a concave root surface with a negative root penetration.

The convex root surface 96 has a root penetration 92 that extends outward from the back surface 27 of the workpiece 18. The root surface 96 extends from roots 98 of the workpiece 18. Some shielding gases, such as argon, nitrogen, and argon/carbon dioxide mixtures (e.g., 95% argon, 5% $CO_2$) may aid formation of a convex root surface 96 with a positive root penetration 92. In some embodiments, the shielding gas 38 flow rate in the purge region 72 may also affect the structure and/or the geometry of the root surface 96 of the weld deposit 88. For example, flow rates to the purge region 72 that enable the pressure of the shielding gas 38 in the purge region 72 to be more than 50 CFH may flatten the root surface 96 and/or cause a concave root surface 96.

Figure 3:
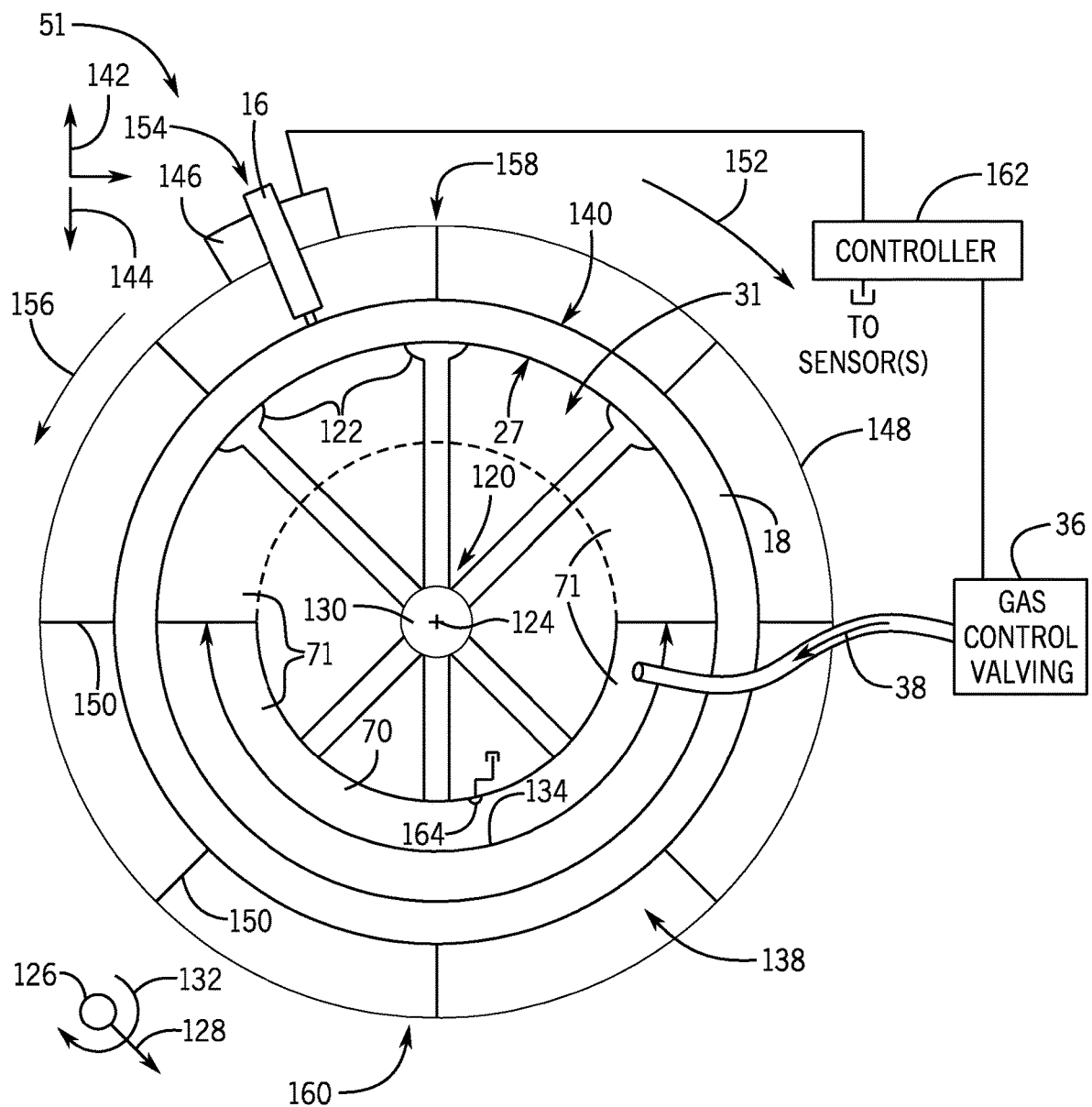
FIG. 3 is an end view of an embodiment of the back purging system and a clamping system for a tubular workpiece.

The sealing portion 70 may be offset a distance 102 from the roots 98 of the weld deposit 88 to reduce the heating of the sealing portion 70. The sealing portion 70 extends along at least a portion of a length (e.g., arc length) of the full length of the joint 68. In some embodiments, the sealing portion 70 is part of a clamping system configured to maintain a desired position and/or orientation of the sections 82, 84 of the workpiece 18 relative to one another. FIG. 3 is an end view of an embodiment of a tubular workpiece 18 and the back purging system 31, which includes the sealing portion 70 and a clamping system 120. Clamps 122 of the clamping system 120 engage with the back surface 27 of the workpiece 18. The clamping system 120 extends along an axis 124 of the workpiece 18 in an axial direction 126, and the clamps 122 may extend in a radial direction 128 from a hub 130. The clamps 122 may be mechanically and/or fluidly (e.g., pneumatically, hydraulically) driven to engage with the back surface 27. In some embodiments, clamps 122 are axially offset to enable a first axial set of clamps 122 to engage with the first section 82 of the workpiece 18, and to enable a second axial set of clamps 122 to engage with the second section 84 of the workpiece 18. Additionally, or in the alternative, some clamps 122 may extend in the axial direction 126 at least partially across the joint 68. In some embodiments, the clamping system 120 is configured to engage the workpiece 18 to axially and/or radially align the sections 82, 84 of the workpiece 18 about the joint 68. That is, the clamping system 120 may facilitate a concentric alignment of the sections 82, 84 about the axis 124. Moreover, the clamping system 120 may facilitate control of an axial offset (e.g., root opening) of the opening 80, such as by adjusting the axial position of the first section 82 relative to the second section 84.

As discussed above, the sealing portion 70 of the back purging system 31 forms a purge region 72 on the back surface 27 adjacent to the joint 68. In some embodiments, the sealing portion 70 is axially offset from (e.g., axially between) the clamps 122. The sealing portion 70 may extend in a circumferential direction 132 along at least a portion of the back surface 27. For example, the sealing portion 70 may extend along a first arc length 134 or substantially the entire circumference of the back surface 27 along the joint 68. The first arc length 134 may extend along approximately 10, 20, 30, 40, 50, 60, 70, 80, or 90 percent or more of the circumference of the back surface 27. FIG. 3 illustrates an embodiment of the sealing portion 70 having the first arc length 134 of approximately 50 percent of the circumference of the back surface with the solid outlined sealing portion 70. The sealing portion 70 may have end members 136 that form the purge region 72 between the sealing portion 70 and the back surface 27. In some embodiments, a welding operation may begin at a point (e.g., a top 158) of the workpiece 18 that is not opposite the sealing portion 70, and end at another point (e.g., a bottom 160) of the workpiece 18 that is opposite the sealing portion 70. FIG. 3 illustrates an embodiment of the sealing portion 70 that extends along substantially the entire circumference of the back surface 27 with the solid and dashed outlined sealing portion 71. Accordingly, the sealing portion 71 forms an annular purge region 72 on the back surface 27. As discussed above, the purge region 72 receives the shielding gas 38 from gas control valving 36.

As illustrated in FIG. 3, embodiments of the first arc length 134 may extend along a lower portion 138 of the workpiece 18 that is below an upper portion 140, where the lower portion 138 is below the upper portion relative to a vertical direction 142. The first arc length 134 may extend approximately 25 or 50 percent of the back surface 27, such as along the lower portion 138 or approximately half of the lower portion 138. As may be appreciated, welding operations for the joint 68 along the lower portion 138 from the front surface 25 correspond to vertical and/or overhead welding positions such that gravity in direction 144 exerts a force on the weld deposit toward the front surface 25. As described herein, the sealing portion 70 and the purge gas within the purge region 72 enable the root surface 96 of the weld deposit 88 in the joint 68 to have a convex shape with a positive root penetration 92 from the back surface 27 despite a vertical and/or overhead welding position for the lower portion 138.

In some embodiments, the robotic system 51 may utilize a robotic driver 146 (e.g., welding bug) that moves along a track 148 to form the weld deposit 88 in the joint 68. The robotic driver 146 may move along the track 148, thereby controlling the movement (e.g., circumferential movement) of the torch 16 along the joint 68 to form the weld deposit 88. Members 150 mounted to the workpiece 18 support the track 148. In some embodiments, the robotic system 51 may utilize multiple robotic drivers 146 coupled to the track 148. For example, a first robotic driver 146 may move in a clockwise direction 152 from a starting point 154, and a second robotic driver 148 may move in a counter-clockwise direction 156. In some embodiments, the robotic driver 146 moves from the top 158 of the workpiece 18 to the bottom 160 in the clockwise direction 152, the robotic driver 146 is reset at the top, then moves from the top 158 to the bottom in the counter-clockwise direction 156. Accordingly, the first arc length 134 of the sealing portion 70 may be approximately 25 percent of the circumference of the back surface 27 at a first side of the lower portion 138, and the sealing portion 70 may be reset to form the purge region 72 at the opposite second side of the lower portion when the robotic driver 146 is reset at the top 158. A controller 162 coupled to the robotic system 51 and to the gas control valving 36 may stop or pause the robotic driver 146 until the purge region 72 has the desired concentration and/or pressure of the shielding gas 38 to enable the desired root face 96 of the weld deposit 88. The controller 162 may utilize one or more sensors 164 (e.g., composition sensors, pressure sensors) to determine the concentration and/or pressure of the shielding gas 38 in the purge region 72.

Figure 4:
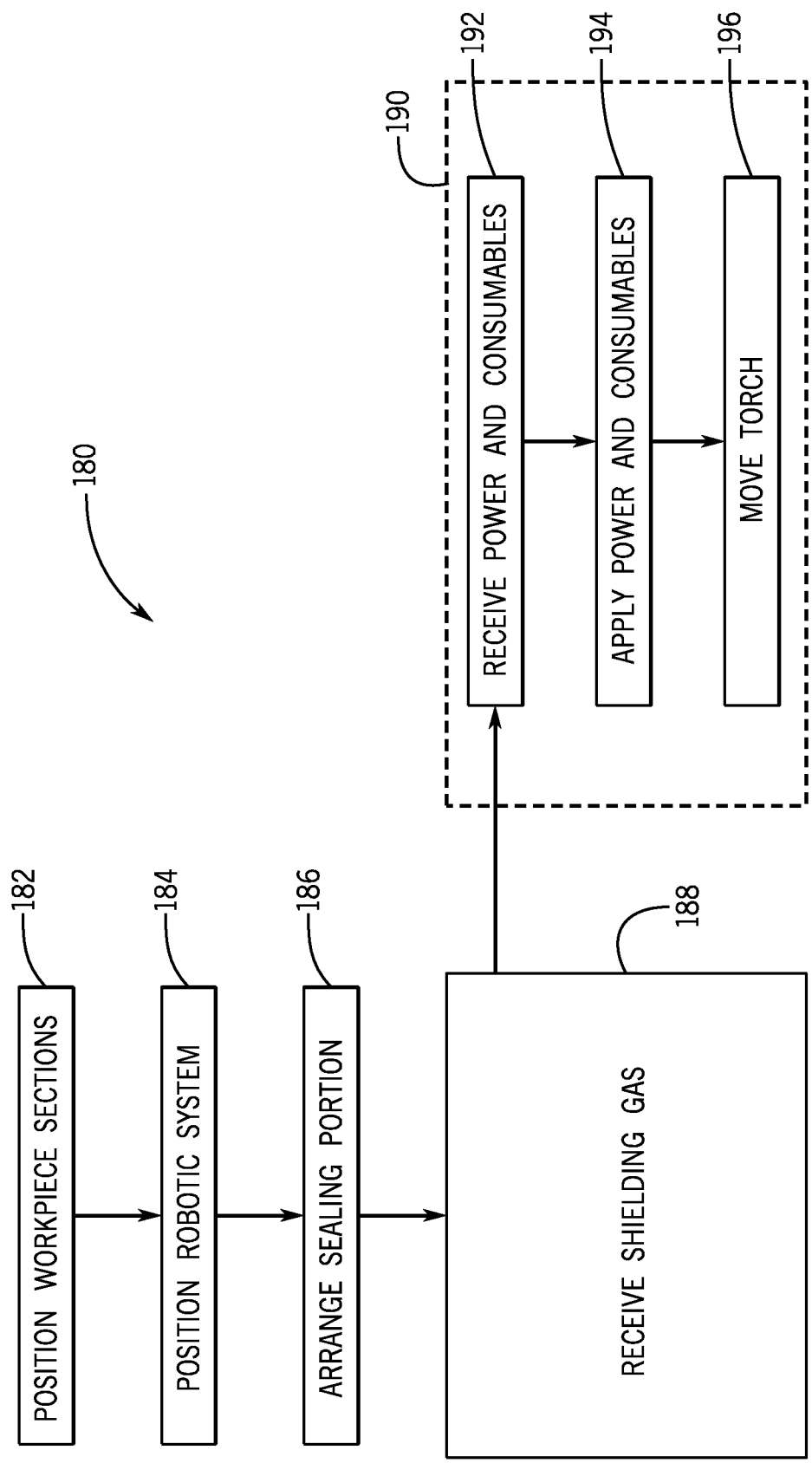
FIG. 4 is a flow chart illustrating logic for an embodiment of a method of utilizing the back purging system.

FIG. 4 is an embodiment of a method 180 of utilizing the back purging system described above to affect the root face of a weld deposit. In some embodiments, a clamping system positions (block 182) sections of a workpiece (e.g., pipes) in a desired position, thereby establishing the joint to be welded. In some embodiments, the material of the workpiece is a mild steel, such as X65, X70, and X80 steel. As may be appreciated, the method 180 may be utilized for joining mild steel pipes utilized for hydrocarbon pipelines. Where the robotic system is to perform the weld, the robotic system (e.g., track, robotic driver) is positioned (block 184) about the joint. The sealing portion is arranged (block 186) proximate to the back face of the workpiece (e.g., inside of pipe). In some embodiments, the sealing portion may be arranged on the back face at locations corresponding to portions of the joint that are to be welded with out-of-position welding positions, such as vertical and/or overhead positions. In some embodiments, the sealing portion is arranged on the back face along the length (e.g., circumference) of the joint. The sealing portion is arranged (block 186) to form the purge region between the back face of the workpiece and the sealing portion.

Once the sealing portion is arranged (block 186), the purge region within the sealing portion receives (block 188) the shielding gas. The shielding gas displaces the ambient environment within the purge region, thereby controlling the environment within the purge region. As discussed above, the shielding gas may include, but is not limited to, argon, nitrogen, and mixtures of argon and carbon dioxide (e.g., 95% Ar, 5% $CO_2$). After receiving the shielding gas for a purge duration (e.g., between approximately 5 to 120 seconds, 15 to 60 seconds, or 30 to 45 seconds), the welding operation (box 190) may begin. The welding operation may be performed by the robotic system or manually by the operator. During a MIG welding operation, the welding torch receives (block 192) welding power, the shielding gas, and the welding wire. The welding torch applies (block 194) the power to the welding wire fed through the welding torch, thereby forming the arc and depositing the weld deposit within the shielding gas supplied by the welding torch. The robotic system or the operator moves (block 196) the welding torch along the joint, thereby forming the weld along the joint between the sections of the workpiece. Throughout the welding operation (box 190), the purge region continues to receive (block 188) the shielding gas. The shielding gas within the purge region facilitates the formation of a convex root shape of the weld deposit on the back surface of the workpiece. Moreover, the effect of the shielding gas within the purge region on the root shape enables the robotic system or the operator to form the desired convex root shape with a greater travel speed of the welding torch relative to the workpiece and/or greater heat input for root pass welding than if the shielding gas is not applied to the purge region as described above. Furthermore, the shielding gas compositions described herein (e.g., argon, nitrogen, 95% argon, 5% carbon dioxide) are believed to affect the surface tension of the root face of the weld deposit relative to the workpiece, thereby facilitating the convex root shape for vertical and/or overhead welding positions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling a back weld root surface, comprising:

arranging a sealing portion of a back purging system along the back weld root surface of a workpiece to form a purge region adjacent to a section of a joint and to seal the purge region from other sections of the joint, wherein a length of the section of the joint is less than an entire length of the joint, wherein the sealing portion is part of a clamping system comprising one or more clamps extending in an axial direction across the joint to engage first and second sections of the workpiece separated by the joint, the clamping system configured to maintain a desired position or orientation of the first and second sections of the workpiece relative to one another to axially or radially align the first and second sections about the joint by controlling an axial offset of the opening by moving the one or more clamps of the clamping system to adjust the axial position of the first section relative to the second section;

supplying a shielding gas within the purge region at a first flow rate, wherein the shielding gas displaces an ambient environment within the purge region; and applying a weld deposit across a front surface of the section of the joint, wherein the back weld root surface of the weld deposit comprises a convex root surface with a positive root penetration relative to the back weld root surface based at least in part on the shielding gas within the purge region.

2. The method of claim 1, wherein the shielding gas consists essentially of argon or nitrogen.

3. The method of claim 1, wherein the first flow rate received into the purge region is greater than a second shielding gas flow rate emitted towards the front surface of the workpiece.

4. The method of claim 1, wherein applying the weld deposit across the section of the joint comprises applying the weld deposit from a welding torch disposed in an overhead welding position, a vertical welding position, or any combination thereof, and the length of the section along the joint is less than 50 percent of the full length of the joint.

5. The method of claim 1, wherein the workpiece comprises a pipe.

6. The method of claim 5, wherein the pipe comprises a mild steel pipe.

7. The method of claim 5, comprising positioning the pipe in a desired position utilizing the clamping system to extend along an axis of the pipe.

8. The method of claim 1, comprising moving a welding torch along the joint via a robotic system, wherein moving the welding torch comprises applying the weld deposit across the section of the joint.

9. A welding system comprising:

a back purging system comprising:

a sealing portion configured to form a purge region between the sealing portion and a back weld root surface of a workpiece adjacent to a section of a joint, wherein the sealing portion is configured to interface with the back weld root surface of the workpiece and to seal the purge region from other sections of the joint, the workpiece comprises a pipe, the sealing portion is configured to extend along an arc length of the section of the joint, and the arc length is less than 60 percent of a circumference of the back weld root surface of the joint, wherein the sealing portion is part of a clamping system comprising one or more clamps extending in an axial direction across the joint to engage first and second sections of the workpiece separated by the joint, the clamping system configured to maintain a desired position or orientation of the first and second sections of the workpiece relative to one another by controlling an axial offset of the opening by moving the one or more clamps of the clamping system to adjust the axial position of the first section relative to the second section; and gas control valving coupled to the sealing portion, wherein the gas control valving is configured to supply a shielding gas to the sealing portion to displace an ambient environment within the purge region, and the shielding gas is configured to control the back weld root surface of a weld deposit formed along the section of the joint to comprise a convex root surface with a positive root penetration relative to the back weld root surface.

10. The welding system of claim 9, wherein the shielding gas comprises argon, nitrogen, less than approximately 5 percent carbon dioxide, or any combination thereof.

11. The welding system of claim 9, wherein the sealing portion extends along a lower portion of the joint that corresponds to vertical welding positions or overhead welding positions from a front weld surface of the workpiece.

12. The welding system of claim 9, wherein the section of the joint is configured to receive the weld deposit from a welding torch disposed in an overhead welding position, a vertical welding position, or any combination thereof.

13. The welding system of claim 9, wherein the clamping system is disposed along an axis of the workpiece, wherein the clamping system comprises the back purging system and clamps configured to interface with the back weld root surface of the workpiece.

14. The welding system of claim 9, wherein the gas control valving is configured to adjust a flow rate of the shielding gas to the purge region.

15. The welding system of claim 9, comprising a robotic system coupled to a welding torch, wherein the robotic system is configured to move the welding torch along the joint to apply the weld deposit.

16. The welding system of claim 9, comprising:
a power supply configured to supply welding power to a welding torch;
a wire feeder coupled to the power supply and configured to supply a welding wire to the welding torch; and
the welding torch coupled to the power supply, to the wire feeder, and to the gas control valving, wherein the welding torch is configured to apply the weld deposit along the section of the root opening of the joint.

17. A welding system comprising:
a back purging system comprising:
a sealing portion configured to form a purge region between the sealing portion and a back weld root surface of a workpiece adjacent to a section of a joint, wherein the sealing portion is configured to interface with the back weld root surface of the workpiece and to seal the purge region from other portions of the joint, the workpiece comprises a pipe, and the section of the joint opposite the sealing portion comprises a lower portion of the pipe that extends along less than 60 percent of a circumference of the back weld root surface of the joint, wherein the section of the joint is configured to receive a weld deposit from a welding torch disposed in an out-of-position welding position, wherein the joint is an open roots type of joint with an opening between two sections of the joint that are a non-zero distance apart, wherein the sealing portion is part of a clamping system comprising one or more clamps extending in an axial direction across the joint to engage first and second sections of the workpiece separated by the joint, the clamping system configured to maintain a desired position or orientation of the first and second sections of the workpiece relative to one another by controlling an axial offset of the opening by moving the one or more clamps to adjust the axial position of the first section relative to the second section; and gas control valving coupled to the sealing portion, wherein the gas control valving is configured to supply a shielding gas to the sealing portion to displace an ambient environment within the purge region, the shielding gas comprises argon, nitrogen, less than approximately 5 percent carbon dioxide, or any combination thereof, and the shielding gas is configured to control the back weld root surface of the weld deposit formed along the section of the joint to comprise a positive root penetration relative to the back weld root surface; and a robotic system coupled to the welding torch, wherein the robotic system is configured to move the welding torch along the joint to apply the weld deposit on a front surface of the workpiece beginning at a first point that is not opposite the sealing portion and ending at a second point that is opposite the sealing portion.

18. The welding system of claim 17, wherein the sealing portion extends along a first length of the section of the joint, and the first length is 25 percent of the back weld root surface along the joint.

19. The welding system of claim 9, wherein the sealing portion is constructed from a flexible conduit configured to follow a contour of the back weld root surface of the workpiece along the section of the joint to form the purge region.

20. The welding system of claim 9, wherein the sealing portion comprises one or more sealing surfaces and one or more walls that, which the sealing surfaces are in sealing contact with the workpiece, define the purge region in cooperation with the workpiece.

21. The welding system of claim 9, wherein the sealing portion comprises one or more sealing surfaces and one or more walls that extend along an arc length of a circumference of a back surface of the joint, wherein the arc length is less than the circumference of the back surface of the joint.

* * * * *